United States Patent [19]

Züger

[11] Patent Number: 5,736,854
[45] Date of Patent: Apr. 7, 1998

[54] TUBULAR COIL UNIT OF AN INDUCTIVE TRANSDUCER FOR MEASURING DISPLACEMENTS

[75] Inventor: Eric Züger, Renens, Switzerland

[73] Assignee: Tesa SA, Switzerland

[21] Appl. No.: 404,093

[22] Filed: Mar. 14, 1995

[30] Foreign Application Priority Data

Mar. 21, 1994 [EP] European Pat. Off. ............ 94104417

[51] Int. Cl.⁶ ............... G01B 7/14; G01B 7/00; G01D 5/22; H01F 21/08

[52] U.S. Cl. ............... 324/207.12; 324/207.24; 336/65

[58] Field of Search ............ 324/207.12, 207.15, 324/207.16, 207.17, 207.19, 207.25, 207.24, 228, 225, 234, 236, 239, 243, 262; 336/20, 45, 65, 68, 90, 92, 199

[56] References Cited

U.S. PATENT DOCUMENTS 3,449,662  6/1969  Wood ............................ 324/220

FOREIGN PATENT DOCUMENTS

| U-90-13-582 | 1/1991 | Germany . | |
| 56-29113 | 3/1981 | Japan . | |
| 2-296108 | 12/1990 | Japan . | |
| 1489185 | 10/1977 | United Kingdom ............ 324/207.18 |
| A-2-080-632 | 2/1982 | United Kingdom . | |

OTHER PUBLICATIONS

Patent Abstracts of Japan, vol. 5, No. 145 (E–074), Sep. 12, 1981, JP–56–079–844, Hideyuki Sakai et al., "Yoke assembly for camera tube".

Electronique Industrielle, Jul.–Aug. 1963, vol. 65, pp. 229–233, Jean–Noël Herve, "Mesure des micro–déplacements".

*Primary Examiner*—Walter E. Snow
*Attorney, Agent, or Firm*—Oliff & Berridge, P.L.C.

[57] ABSTRACT

The unit is used to produce an electrical displacement-measurement signal in response to the internal movements of a core of magnetic material connected to a probe of a feeler for measuring linear magnitudes. The unit comprises, aligned within a tube (8), two coils (9), a spacer (10) of elastic material compressed between the two coils, and two end flanges (11) of the tube between which the two coils and the elastic spacer are gripped. The insertion of the elastic spacer between the two coils is provided in order to make symmetrical, in relation to the zero position of the system denoted by a median plane (P), the linearity error generated by the differing manufacturing dimensions of the elements aligned within the tube.

5 Claims, 1 Drawing Sheet

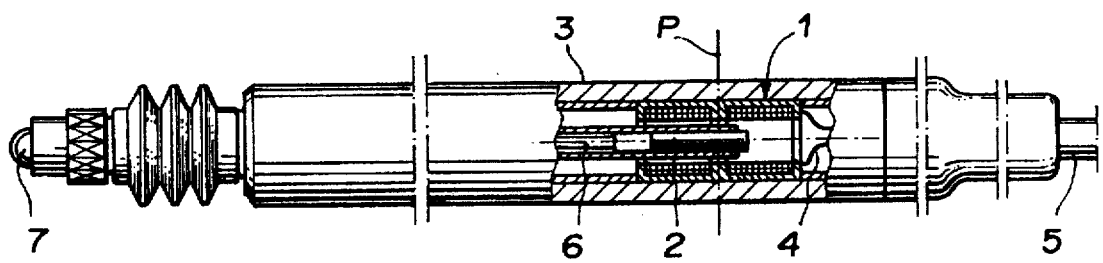
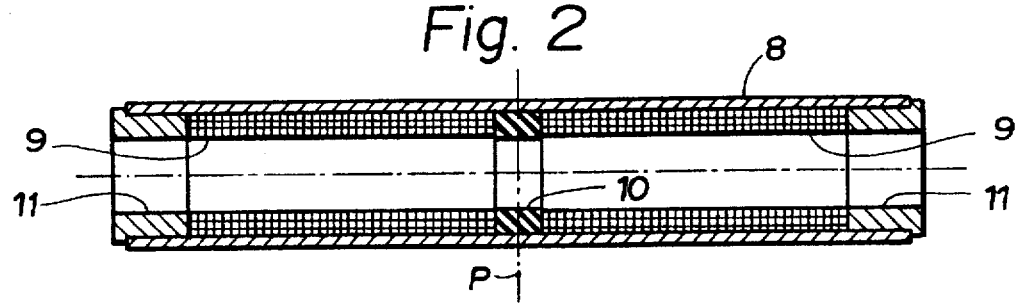
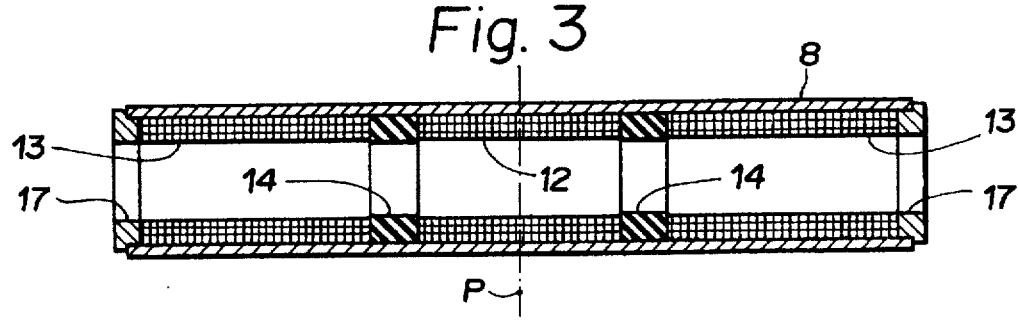
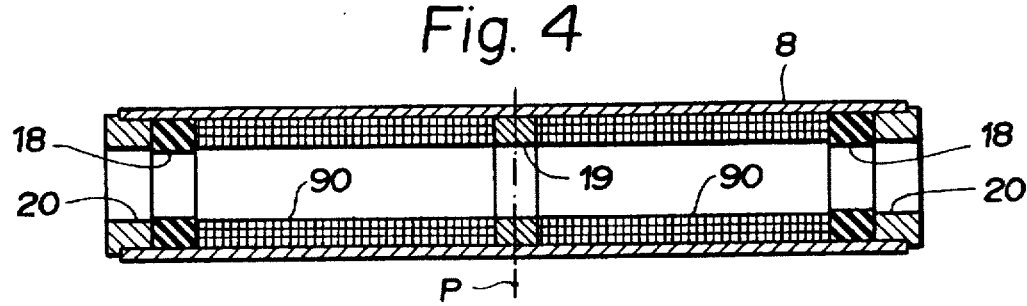
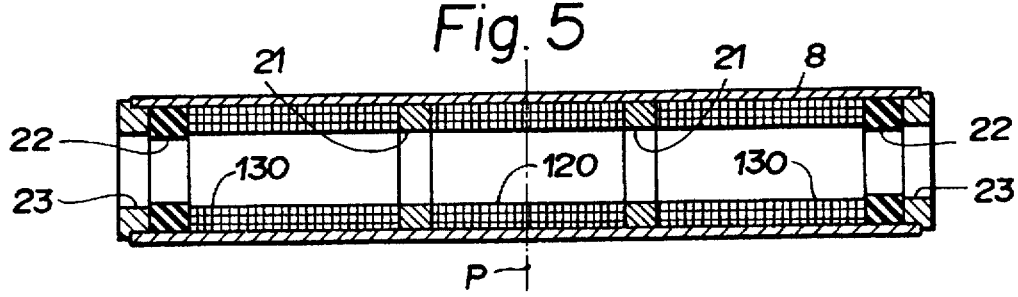

TUBULAR COIL UNIT OF AN INDUCTIVE TRANSDUCER FOR MEASURING DISPLACEMENTS

This invention relates to transducer coils, and more particularly to a tubular coil unit of an inductive transducer for measuring displacements, of the type having a plurality of coils and spacers stacked between two end flanges within a tube, and wherein the distribution of the coils must be symmetrical with respect to the middle of the length of the unit.

Prior art transducers of this type are used to produce an electrical signal representing the relative displacements of a probe with respect to the reference body of certain measuring feelers used especially for the measurement and size checking of mechanical parts in factory workshops.

In such feelers, a movable probe is connected by a rod to a core of magnetic material guided for translatory motion within a tubular coil unit fixed in the reference body in such a way as to modify the impedance of the coils and thus produce the electrical measurement signal. The algebraic value of the measurement is defined in relation to a zero position denoted by the position of a median transverse plane of the coil unit, i.e., in the middle of the length of the tube in which its elements—coils, spacers, and flanges—are aligned.

In order to obtain a transducer having good performance and the smallest possible error in linearity for a given design, and taking into account the mode of assembly by aligning the elements composing the coil unit, it would be necessary to assemble these elements in their nominal symmetry positions; but this is not possible in practice because of the range of longitudinal dimensions of these elements due to machining tolerances.

For either the sum of the lengths of the coils, flanges, and spacers is less than the length of the tube, or it is greater. In the former instance, the residual play causes non-symmetrical assembly and generates a large error in linearity. In the latter instance, the excess length causes a problem in fitting the flanges into the tube.

Only the problematical and relatively fortuitous case of a sum of coil, spacer, and flange lengths equal to the length of the tube would permit optimum assembly of the coil unit.

It is an object of this invention to provide an improved tubular coil unit for a transducer which remedies the above-mentioned drawbacks relating to the differing manufacturing dimensions of the elements aligned in the tube of the coil unit.

To this end, the tubular coil unit according to the present invention, of the type initially mentioned, comprises at least one spacer of elastic material compressed between two elements of the stack.

In this way, any difference, positive or negative, between the sum of the lengths of the elements of the coil unit and the length of the tube in which they are are aligned, is compensated for by the deformation of the spacer of elastic material which assumes a state of greater or lesser compression between two elements, depending upon the magnitude of the aforementioned difference. This, in conjunction with the symmetrical distribution of the coils of the unit within the tube, means that the spacer of elastic material constitutes an automatic centering means making it possible to obtain the smallest possible error in linearity of the electrical measurement signal produced for a given design, this error in linearity thus always being made symmetrical in relation to the zero position of the system.

Starting from the basic concept of the invention, various alignment structures of the elements composing the coil unit are proposed.

In a first embodiment, the coil unit comprises two coils and a spacer of elastic material compressed between them, the two coils further resting against the two end flanges of the tube. This first embodiment is suitable for the most common transducers having only two coils.

In a second embodiment appropriate for transducers in which a primary coil is placed between two secondary coils, the coil unit comprises three coils and two spacers of elastic material of the same length, each compressed between two adjacent coils, the two ends of this assembly of three coils and two spacers resting against the two end flanges of the tube.

In a modification of the first embodiment, the coil unit comprises two coils, a spacer of rigid material between the two coils, and two spacers of elastic material of the same length, each compressed between one of the two end flanges of the tube and one of the two coils.

Finally, in a modification of the second embodiment, the coil unit comprises three coils, two rigid spacers the same length, each situated between two adjacent coils, and two spacers of elastic material of the same length, each compressed between one of the two flanges of the tube and the assembly of the aforementioned three coils and two rigid spacers.

These preferred embodiments of the invention, as well as the possible modifications thereof, will now be described in detail with reference to the accompanying drawings, in which:

FIG. 1 is a perspective view, partially in section, of a feeler,

FIG. 2 is an axial section of the tubular coil unit in a first embodiment of the invention, FIG. 3 is an axial section of the tubular coil unit in a second embodiment of the invention, FIG. 4 is an axial section of the tubular coil unit in a modification of the first embodiment, and FIG. 5 is an axial section of the tubular coil unit in a modification of the second embodiment.

The feeler illustrated partially in FIG. 1 comprises an electromagnetic transducer for measuring displacements, composed of a tubular coil unit 1 and a movable core 2 of magnetic material. Coil unit 1 is held in a fixed position within a reference body 3 and fed by lead wires 4 of a cable 5. Core 2 is secured to the end of a rod 6 guided for translatory motion in body 3. Outside body 3, rod 6 comprises a probe 7, the translatory movements of which along the longitudinal axis of the feeler bring about equal movements of core 2 in the same directions within coil unit 1. A measurement signal of the relative displacements of probe 7 in relation to reference body 3 of the feeler is thus produced by changing the impedance of the coils of unit 1. The algebraic value of the measurement is defined relative to a zero position denoted by a medial transverse plane P of coil unit 1, constituting the symmetry plane of the distribution of the coils, the position of which is desired to be inalterable for a given design, which design may be different according to the type of coil unit considered.

In the first embodiment of the invention illustrated in FIG. 2, the coil unit comprises a holding tube 8 in which two coils 9, a spacer 10, and two end flanges 11 are aligned. Spacer 10, made of an elastic material such as dielectric rubber, for example, is placed between the two coils 9. Tube 8 and the two flanges 11 are of a rigid material, the assembly of coils 9 and spacer 10 being gripped between the two flanges 11, and the latter being secured to tube 8, e.g., by cementing or force-fitting.

The length of elastic spacer 10 along the length of the tubular unit thus produced is defined in such a way that spacer 10 is always compressed between the two coils 9 whatever the range of the longitudinal dimensions of the other elements within the limits of their manufacturing tolerances. Elastic spacer 10 compressed between coils 9 thus permits their symmetrical assembly in relation to the inner contact surfaces of the two flanges 11 against which they rest. As a result, the linearity error of the measurement signal caused by the differing longitudinal dimensions of the elements of the unit aligned within tube 8 is as small as possible because it is symmetrical with respect to the zero position of the system denoted by median plane P.

The second embodiment of the invention shown in FIG. 3 is a tubular coil unit of an electromagnetic transducer in which a primary coil 12 is housed within tube 8 between two secondary coils 13. In this design, two spacers 14 of elastic material, of the same length, are each compressed between two of the three coils; and the ends of this assembly of three coils 12, 13 and two elastic spacers 14 rest against two end flanges 16 of tube 8. In this way, primary coil 12 is automatically centered between the two secondary coils 13, and the linearity error is as small as possible here, too, owing to its symmetry with respect to the zero position of the system denoted by median plane P.

It will be understood that the same configuration applies if there is a secondary coil housed in the tube between two primary coils.

Modifications of the two embodiments just described, as illustrated in FIGS. 4 and 5, present the same advantages relative to the symmetry of the error in linearity in relation to the zero position of the system denoted by median plane P.

In the modification of the first embodiment as shown in FIG. 4, the unit comprises two coils 90, a spacer 19 of rigid material situated between coils 90, and two spacers 18 of elastic material, each compressed between one of the two end flanges 20 of tube 8 and one of the coils 90.

In the modification of the second embodiment as shown in FIG. 5, the unit comprises three coils, viz., a primary coil 120 and two secondary coils 130, two rigid spacers 21 of the same length, each situated between two of the three coils, and two spacers 22 of elastic material, each compressed between one of the two flanges 23 of tube 8 and the assembly of the aforementioned three coils 120, 130 and two spacers 21.

Here, too, the same configuration applies if there is a secondary coil between two primary coils.

It will be understood that the inventive concept also applies to coil units comprising a number of coils greater than in the embodiments described.

What is claimed is:

1. A tubular coil unit of an inductive transducer for measuring displacements, comprising:

a tube with two end flanges;

an alignment of elements including said two end flanges and a plurality of coils and spacers disposed within said tube, a distribution of said coils being symmetrical with respect to a longitudinal center of said unit; and at least one spacer of elastic material compressed between two of said elements of said alignment of elements, wherein the plurality of coils is slidably disposed within said tube and said at least one spacer is disposed so as to center said alignment of elements.

2. The tubular coil unit of claim 1, wherein said alignment of elements includes two coils and a spacer of elastic material compressed between said two coils, said two coils respectively resting against said two end flanges.

3. The tubular coil unit of claim 1, wherein said alignment of elements includes three coils and two spacers of elastic material of equal length, each of said two spacers being compressed between two of said three coils such that two of said coils respectively rest against said two end flanges.

4. The tubular coil unit of claim 1, wherein said alignment of elements includes two coils, a spacer of rigid material disposed between said two coils, and two spacers of elastic material of equal length, each of said two spacers being compressed between one of said two end flanges and one of said two coils.

5. The tubular coil unit of claim 1, wherein said alignment of elements includes three coils, two rigid spacers of equal length, each of said rigid spacers being disposed between two of said coils, and two spacers of elastic material of equal length, each of said spacers of elastic material being compressed between one of said two end flanges and said coils and two rigid spacers.

\* \* \* \* \*